US012782158B2

(12) United States Patent
Gomezcaballero et al.

(10) Patent No.: US 12,782,158 B2
(45) Date of Patent: Nov. 3, 2026

(54) MAP INFORMATION PROCESSING DEVICE

(71) Applicant: HITACHI ASTEMO, LTD., Hitachinaka (JP)

(72) Inventors: Felipe Gomezcaballero, Tokyo (JP); Hideaki Kido, Tokyo (JP); Takashi Nomura, Tokyo (JP); Naoki Mori, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 18/835,532

(22) PCT Filed: Aug. 12, 2022

(86) PCT No.: PCT/JP2022/030806
§ 371 (c)(1),
(2) Date: Aug. 2, 2024

(87) PCT Pub. No.: WO2023/170997
PCT Pub. Date: Sep. 14, 2023

(65) Prior Publication Data

US 2025/0130063 A1 Apr. 24, 2025

(30) Foreign Application Priority Data

Mar. 11, 2022 (JP) ................................ 2022-038416

(51) Int. Cl.
*G01C 21/00* (2006.01)

(52) U.S. Cl.
CPC ................................ *G01C 21/3822* (2020.08)

(58) Field of Classification Search
CPC ................ G01C 21/38; G01C 21/3804; G01C 21/3807; G01C 21/3811; G01C 21/3815;
(Continued)

(56) References Cited

U.S. PATENT DOCUMENTS

2021/0309231 A1* 10/2021 Fujita ................ G01C 21/3841
2021/0382144 A1* 12/2021 He ......................... G01S 7/003

FOREIGN PATENT DOCUMENTS

JP 2004-020292 A 1/2004
JP 2009-230518 A 10/2009
JP 2018-173511 A 11/2018

OTHER PUBLICATIONS

International Search Report with English Translation and Written Opinion of International Patent Application No. PCT/JP2022/030806 dated Sep. 20, 2022 (12 pages).

(Continued)

*Primary Examiner* — Erin M Piateski
*Assistant Examiner* — John C Merino
(74) *Attorney, Agent, or Firm* — Foley & Lardner LLP

(57) ABSTRACT

Provided is a map information processing device which contributes to the improvement of high-precision map verification performance by generating road information for extracting a road area corresponding to a road and a demarcation line corresponding to a traffic lane from an aerial image, inferring the position of an occlusion which may cover the road, determining if the demarcation line is in the vicinity of the occlusion forms a continuous, and determining whether or not the traffic lane in the vicinity of the occlusion has continuity such that a misunderstanding about the continuity of the road when the presence of no occlusion is possible can be avoided to suppress the inclusion of incorrect information. This device generates traffic lane information which can be also used to generate appropriate traffic lane information for an area for which road information cannot be extracted due to an occlusion.

6 Claims, 6 Drawing Sheets

(58) Field of Classification Search
CPC ............ G01C 21/3819; G01C 21/3822; G01C 21/3852; G01C 21/005; G01C 21/30; G01C 21/3863; G01C 21/3867; G06T 7/00; G06T 7/0002; G06T 7/001; G09B 29/00; G09B 29/003; G09B 29/005; G09B 29/007
See application file for complete search history.

(56) References Cited

OTHER PUBLICATIONS

F. Shinmura et al., "Classification of Road Congestion Status Using Satellite Images and a Three-Dimensional Map", Journal of the Institute of Image Electronics Engineers of Japan, 2013, vol. 42, No. 1, pp. 15-24, with English translation.

* cited by examiner

MAP INFORMATION PROCESSING DEVICE

TECHNICAL FIELD

The present invention relates to a map information processing device processing map information for autonomous driving and an advanced safety driving system.

BACKGROUND ART

There is a known method of collecting road information manually or by an automatic process using information obtained from an image device mounted in a general vehicle and using navigation map information, and generating a high-precision map including road and traffic lane information in a network form so as to be used for autonomous driving and driver assistance.

Since this method needs a considerable amount of human resources, a map can be created only from the limited number of roads such as express highways, the range of map information generated is narrow, and the range of a map which can be provided to autonomous driving and driver assistance is narrow. When the range of a high-precision map created by the above-described method is enlarged, verification of the created high-precision map is necessary, so that the maintenance cost increases.

Therefore, map information of a form similar to that of the high-precision map has to be configured from difference information sources. To obtain the information from road information, there is a known method of creating road information by extracting a road area corresponding to a road from an aerial image (for example, a photo of a ground surface captured from an aircraft or satellite), and generating road information at a traffic lane level (also called "road network" or "traffic lane network") on the basis of the extraction result.

For example, the patent literature 1 provides a method of automatically generating a traffic lane network (information indication connections among traffic lanes included in roads) by extracting line segment information indicating a traffic lane segment from an aerial image of a road, detecting continuity of the line segment in a preset direction in correspondence with the extension direction of the road on the basis of the line segment information, and generating traffic lane information indicating the traffic lane on the basis of the detected continuity.

CITATION LIST

Patent Literature

Patent Literature 1: Japanese Unexamined Patent Application Publication No. 2018-173511

SUMMARY OF INVENTION

Technical Problem

There is, however, the case that an aerial image (for example, a photo of a ground surface taken from an aircraft or a satellite) includes an area in which a road cannot be seen at a place where the image is captured due to a hindrance such as a multistoried intersection, a high-rise building, or a bridge. Consequently, at the time of generating road information by using roads extracted from an image having an area including a hindrance, there is the case that, when an occlusion area is not included in generation of road information, automatically generated road information is not completed. When continuity of a road which is not connected due to no information (that is, a road extraction result does not exist) is determined (at a traffic lane level) by using a line segment extracted from the road and it is proved that there is continuity of the road even when a road area is separated, there is the possibility that erroneous information is included in road information generated for the purpose of verification. As a result, the reliability of the verification may decrease.

An object of the present invention is to provide a map information processing device by functioning as means for extracting a road area corresponding to a road and a demarcation line corresponding to a traffic lane from an aerial image (for example, a photo of a ground surface captured from an aircraft or a satellite), estimating the position of an object or structure (occlusion) which may cover the road, determining whether a demarcation line near the occlusion forms a continuous line or not by using the estimated position of the occlusion and demarcation line information, subsequently determining whether or not there is continuity to a traffic lane near the occlusion, and generating road information at a traffic lane level for the purpose of verification so that an error in continuity of the road when there is the possibility of no occlusion is avoided and inclusion of erroneous information can be suppressed, thereby contributing to improvement of performance of high-precision map verification.

Solution to Problem

To achieve the object, a map information processing device according to the present invention includes: a road information extraction unit extracting road information from an image obtained by shooting a road; a demarcation line information extraction unit extracting demarcation line information from the image; an occlusion estimation unit estimating an occlusion area in which the road is occluded on the basis of the road information extraction unit and a map information conversion unit estimating a road area from map information; a road continuity determination unit determining continuity of the road in the occlusion area on the basis of the demarcation line information; a traffic lane information generation unit generating traffic lane information on the basis of the road information extraction unit and the road continuity determination unit; and a verification unit verifying a traffic lane network stored in a map information storage unit by comparing it with the traffic lane information generated by the traffic lane information generation unit.

Advantageous Effects of Invention

According to the present invention, by using traffic lane information (road information at a traffic lane level) configured from a road area corresponding to a road extracted from an aerial image and assuring that the traffic lane information can be correctly generated even when there is the possibility that an area in which a road may not be seen by an occlusion exists, high-reliability verification of a high-precision map can be executed.

The other objects, configurations, and effects will become apparent from description of the following embodiment.

DESCRIPTION OF EMBODIMENTS

Hereinafter, an embodiment of a map information processing device of the present invention related to a preferred configuration will be described.

Hereinafter, with reference to FIGS. 1 to 6, an embodiment of a map information processing device of the present invention related to the configuration and performance will be described.

In the configuration to be described hereinafter, an image acquired by an image acquisition unit 111 refers to one or plural images of an aerial image type corresponding to a photograph of a ground surface taken from an airplane or a satellite. This image is an image obtained by shooting a road including lanes and/or demarcation lines.

Figure 1:
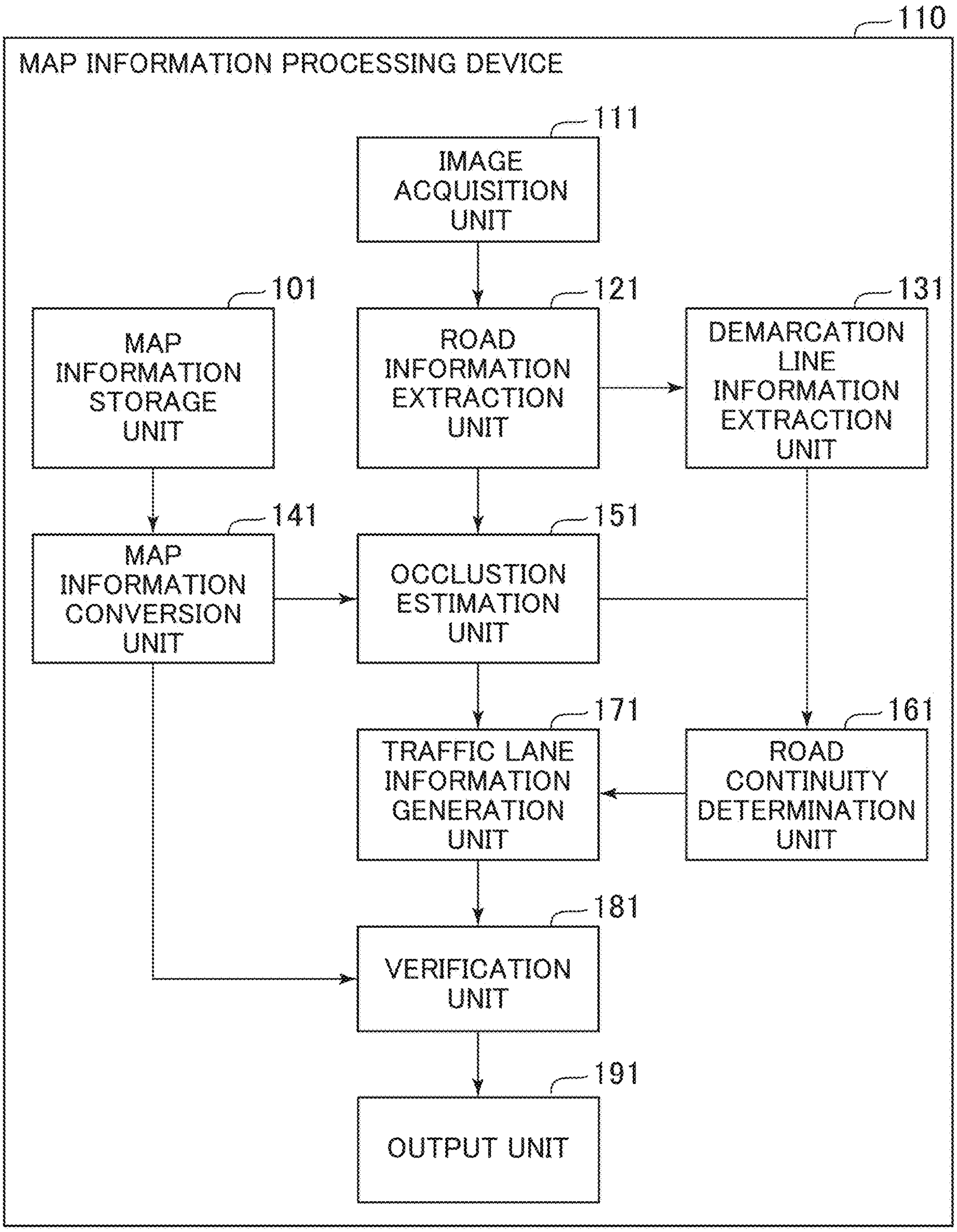
FIG. 1 is a schematic configuration diagram of a map information processing device according to an embodiment of the present invention.

FIG. 1 is a block diagram illustrating the configuration of a map information processing device according to the embodiment. Although not illustrated, a map information processing device 110 has a configuration in which a CPU, a RAM, a ROM, and the like are connected via a communication line. The CPU executes various programs stored in the ROM to control the operation of the whole system.

In FIG. 1, the map information processing device 110 has a map information storage unit 101, the image acquisition unit 111, a road information extraction unit 121, a demarcation line information extraction unit 131, a map information conversion unit 141, an occlusion estimation unit 151, a road continuity determination unit 161, a traffic lane information generation unit 171, a verification unit 181, and an output unit 191.

Map Information Storage Unit 101

The map information storage unit 101 has the responsibility to store information of a map which is processed and verified by the device in the form of traffic lane network information (however, the invention is not limited to the form). There is the possibility that the form of a traffic lane network in a map which can be used for the purpose of navigation is a form of a node and a link, and is an attribute of defining a link shape, and a road of each traffic lane.

Image Acquisition Unit 111

The image acquisition unit 111 can obtain one or plural aerial images from a storage (memory/hard drive) and/or a network and adjust an image characteristic for further process. This process includes image resolution adjustment capable of changing the image size obtained as a result of downscaling or upscaling an input image, image interest selection performed by cutting (out) a specific area in an input image from the original input image for further process, and adjustment of colors and brightness of an image. The present invention, however, is not limited to them.

Road Information Extraction Unit 121

The road information extraction unit 121 obtains an image (an image obtained by shooting a road) obtained by the image acquisition unit 111 as an input and estimates a road area.

Hereinafter, the term "road" will be used to refer to a single traffic lane or a group of traffic lanes. For example, a road area can be estimated as an attribute allocated to each of pixels of an image. A road area can be also extracted in the form of a network expressed by nodes and links. In the case of estimating a road area pixel by pixel of an image, a machine learning-based approach can be employed. For example, a pre-trained model such as a neural network which is trained in advance by machine learning can be used for estimation by applying a method such as semantic segmentation. To estimate more detailed information, a traffic lane area estimator and a traffic lane border estimator which divides a road area into traffic lanes along a traffic lane border can be included. Further, a road border estimator estimating a road area different from a road or the border between a road and a non-road area can be also included.

Demarcation Line Information Extraction Unit 131

The demarcation line information extraction unit 131 receives, as an input, an image acquired by the image acquisition unit 111 (an image obtained by shooting a road) and estimates an area of a line (road paint) as the border between traffic lanes. The above-described line refers to a road sign having a shape of a line along a road (for example, marking of a white traffic lane), and there is the case where white and yellow are included as colors depending on a region and a reference. However, the present invention is not limited to the above. A demarcation line area can be estimated as an attribute allocated to each of pixels of an image by employing a machine learning-based approach. For example, a pre-trained model such as a neural network which is trained in advance by machine learning can be used for estimation by applying a method such as semantic segmentation.

Map Information Conversion Unit 141

The map information conversion unit 141 receives, as an input, (a part or all of) map information stored in the map information storage unit 101, generates an image of an estimated road area on the basis of the above-described map information, and estimates a road area. Like the road information extraction unit 121, to estimate more detailed information, a traffic lane area estimator, a traffic lane border estimator driving a road area into traffic lanes along a traffic lane border, and a road border estimator estimating the border between a road and another road or a border between a road and a non-road area can be also included.

For example, in the case where network information given from a map indicates the center position of a road, by enlarging the range only by the half of pixels corresponding to a traffic lane width in consideration of the number of traffic lanes, a road area can be obtained. In the case where network information given from a map indicates the center of a traffic lane, a road area can be obtained by enlarging the range only by the half of pixels corresponding to the traffic lane width. The actual number of pixels enlarged is determined by, for example, resolution of a distance per pixel of the image obtained by the image acquisition unit 111. Further, when a road or a traffic lane is enlarged, in some cases, a pixel overlapping another road or traffic lane is dealt as a road border or a traffic lane border.

Occlusion Estimation Unit 151

The occlusion estimation unit 151 receives, as inputs, an output of the map information conversion unit 141 and an output of the road information extraction unit 121, and estimates an area in which a road is occluded and is not seen in an image obtained by the image acquisition unit 111. An occluded area can be estimated by any of an approach based on comparison between an output of the map information conversion unit 141 and an output of the road information extraction unit 121 (in the case where both of images are in the same format), a machine learning-based approach, and a combination of the approaches.

In the comparison approach, an output image of the map information conversion unit 141 is received, used as a base, and compared with an output image of the road information extraction unit 121. An area whose road information can be used in the output image of the map information conversion unit 141 but cannot be used in the output image of the road information extraction unit 121 is marked. The marked area is regarded as an occlusion area.

In the case of the machine learning-based approach, an occlusion area can be estimated as an attribute allocated to each of pixels of the image. For example, a pre-trained model such as a neural network which is trained in advance by machine learning can be used for estimation by applying a method such as semantic segmentation. Models which are pre-trained by the device configuration at present are trained for the purpose of identifying a building, a high-rise building, a bridge, and a pedestrian bridge. A target occlusion type of the model can be changed or increased as necessary.

When an occlusion area is estimated, an occlusion area adjacent to road information on the output image of the road information extraction unit 121 is marked. Next, the marked area is regarded as an occlusion area.

Road Continuity Determination Unit 161

The road continuity determination unit 161 receives an output (in the form of an image or a network) of the demarcation line information extraction unit 131, an output (in the form of an image or a network) of the road information extraction unit 121, and an output (in the form of an image or position information related to an image) of the occlusion estimation unit 151, and determines continuity of a road in the occlusion area.

Figure 2:
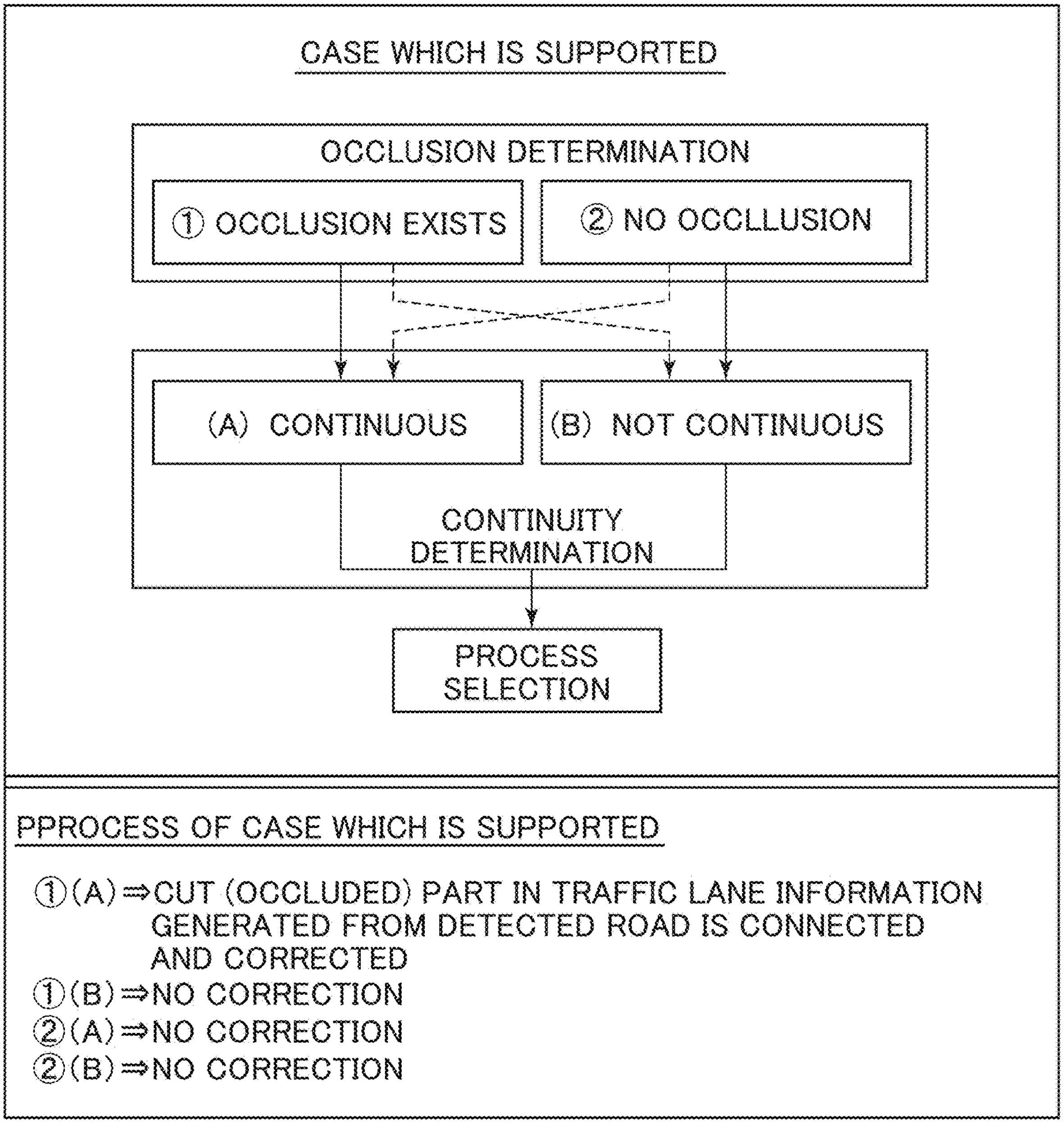
FIG. 2 is a diagram illustrating a case of determining road continuity supported by a present device configuration.

A process of determining road continuity in the device configuration supports the case illustrated in FIG. 2. Each of processes in respective cases can be adjusted.

This process is executed by the following method. First, an output of the demarcation line information extraction unit 131 is used, a given demarcation line end point is checked, and whether the demarcation line end point is adjacent to an occlusion area from an output of the occlusion estimation unit 151 or not is determined on the basis of distance measurement. A distance can be measured by pixels, and a distance threshold value for determining whether the end point is adjacent to the occlusion area can be adjusted on the basis of the resolution of an image obtained by the image acquisition unit 111 and the distance per pixel.

In the case where the demarcation line end point is adjacent to the occlusion area, a separation and continuity check process (which will be described later) is executed. In the other cases, the state of a specific demarcation line end point is not changed at this stage.

Figure 3:
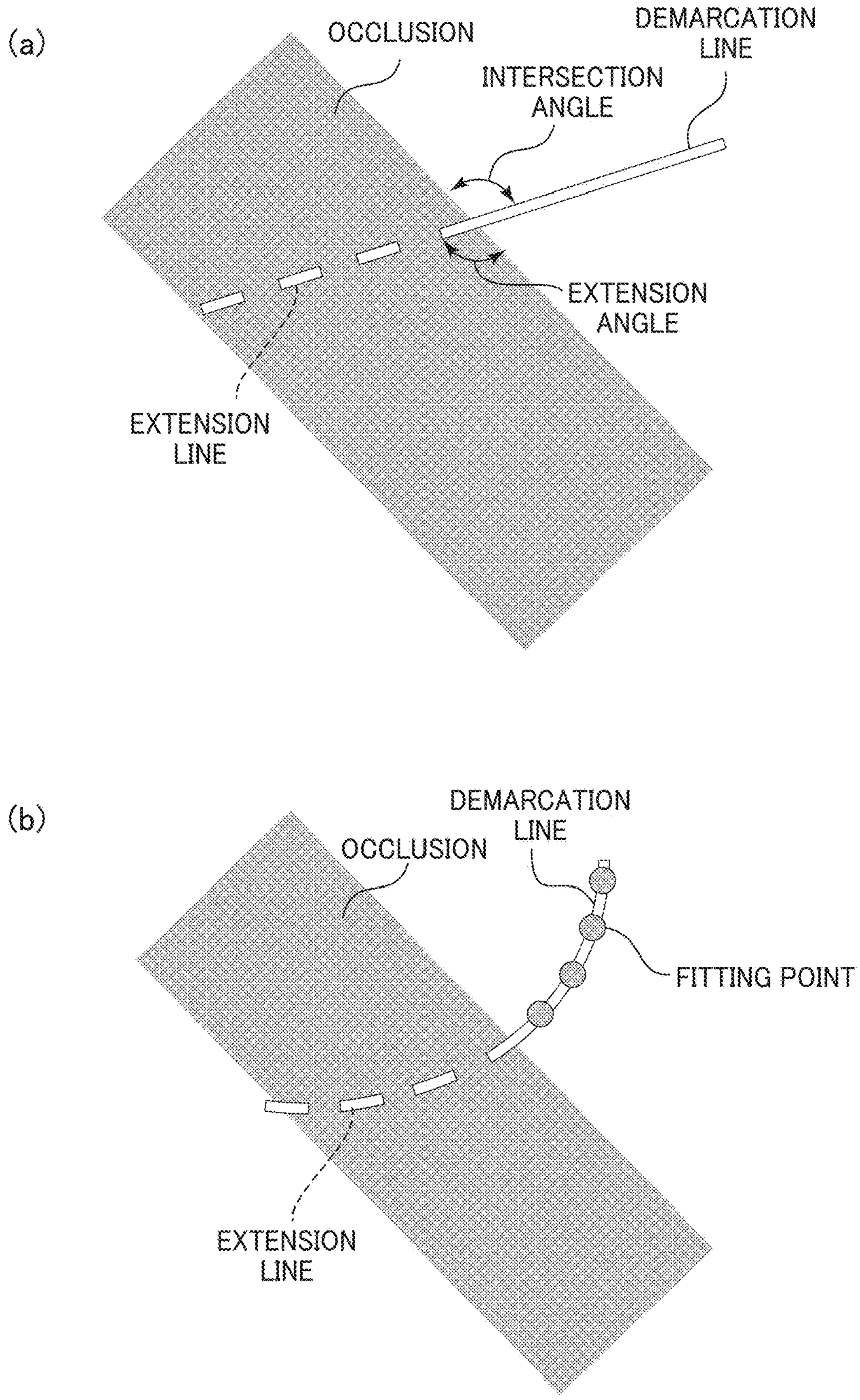
FIG. 3(*a*) is a diagram illustrating an example of the case where a demarcation line which is a straight line is extended near an occlusion area, and FIG. 3(*b*) is a diagram illustrating an example of the case where a demarcation line which is a curved line is extended near an occlusion area.

The line to which the end point belongs crosses the occlusion area on the basis of and according to the shape of the line near the occlusion area and is extended until they cross each other. For example, as illustrated in FIG. 3(*a*), in the case where a line is a straight line, the line is extended in the same way along the direction given by the angle of the line with respect to the occlusion area at the intersection point. In the case where a line is a curved line, as illustrated in FIG. 3(*b*), using a polynomial function obtained by fitting at least four points belonging to a demarcation line near the occlusion area, the line is extended until they cross each other.

Subsequently, using the position of the end point of the extension line (out from the occlusion), the distance to another demarcation line near the occlusion area is calculated, and a connection point candidate in the closest distance within a maximum range of the distance from the end point of the extension line is selected. The maximum range threshold value can be adjusted on the basis of the resolution of an image obtained by the image acquisition unit 111 and the distance per pixel.

After the connection candidate is selected, the extension line and the shape of a line which matches the extension line are compared, and similarity of them is checked. For example, an additional extension line is calculated on the basis of the connection candidate, both of the extension lines are compared, and the difference and an error value can be obtained from both of the lines. The difference is obtained in the case of comparison based on the pixel difference, and an error is obtained in the case of comparison based on a mathematical function for fitting the points to a straight line or a curved line.

When the distance between the end point of the extension line and the end point of the connection candidate (a demarcation line separation amount) and the difference between the extension line and the line from the connection candidate (demarcation line continuity) are within a threshold value which is defined in advance, the continuity of the specific demarcation line is registered. The registered data is used to provide means for describing continuity of the road to which the demarcation line belongs in an output of the road information extraction unit 121.

That is, the road continuity determination unit 161 determines continuity of the road in the occlusion area on the basis of the demarcation line separation amount indicating the distance between at least two demarcation lines existing via the occlusion area and demarcation line continuity indicating whether one of the demarcation lines continues to an extension line estimated from the shape of the other demarcation line or not.

Traffic Lane Information Generation Unit 171

The traffic lane information generation unit 171 receives an output of the road information extraction unit 121, an output of the demarcation line information extraction unit 131, and an output of the road continuity determination unit 161, and generates traffic lane information in either the form of an image or the form of a network expressed by nodes and links for the purpose of verification.

In the case where information at the traffic lane level is not included in an output of the road information extraction unit 121, a traffic lane area estimator and a traffic lane border estimator for dividing a road area into traffic lanes along a traffic lane border are included, an output (line) of the demarcation line information extraction unit 131 is used as a reference, and the road is divided to traffic lanes.

By using output information of the road continuity determination unit 161, a road and a traffic lane which are continuous but are not connected are connected by an output of the road information extraction unit 121. Missing information is generated in an image (pixels of road/traffic lane and line) as necessary.

For example, in the case of using a specific registered road continuous data line, first, by disposing a connection line in the center of a connected traffic lane and enlarging the range only by the half of the pixels corresponding to the traffic lane width, a road area can be completed. When the traffic lane is enlarged, there is the case that a pixel overlapping another road or traffic lane is dealt as a road border or a traffic lane border. The actual number of pixels to be enlarged is determined by, for example, the resolution of distance per pixel in an image obtained by the image acquisition unit 111 or the size of the traffic lane connected.

As described above with reference to FIG. 2, when the occlusion area is extracted by the occlusion estimation unit 151 and the road continuity determination unit 161 determines that there is continuity of a road in the occlusion area, the traffic lane information generation unit 171 corrects (connects the continuous road and traffic lane which is not connected) the output of the road information extraction unit 121 to generate the traffic lane information.

Figure 4:
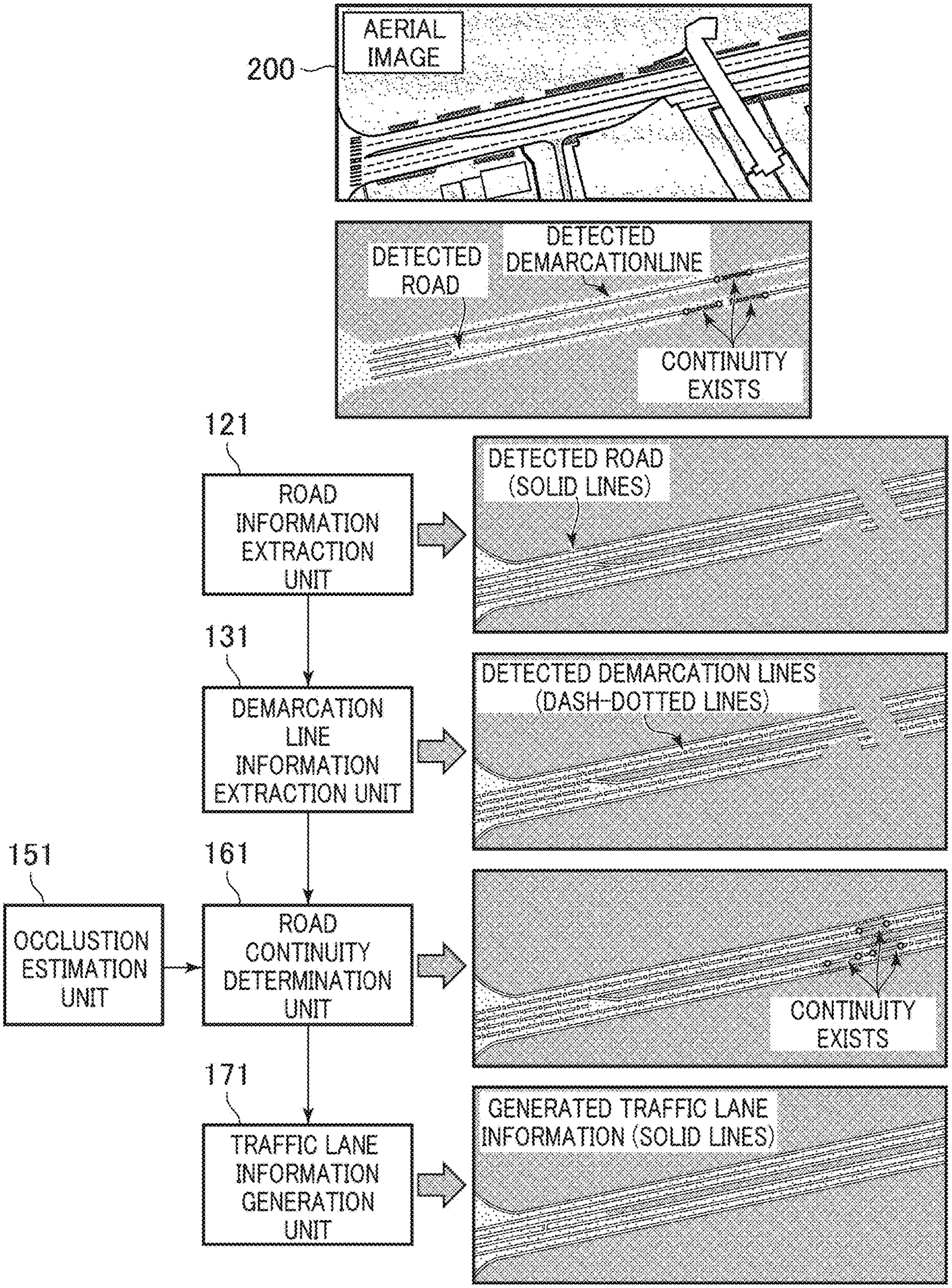
FIG. 4 is a diagram illustrating a process example until traffic lane information is generated.

FIG. 4 illustrates process examples of a process of extracting (detecting) road information by the road information extraction unit 121 on the image (aerial image obtained by shooting a road) 200 acquired by the image acquisition unit 111, a process of extracting (detecting) demarcation line information by the demarcation line information extraction unit 131, a process of determining continuity of the road in the occlusion area estimated by the occlusion estimation unit 151 and the road continuity determination unit 161, and a process of generating traffic lane information by the traffic lane information generation unit 171.

Verification Unit 181

Figure 5:
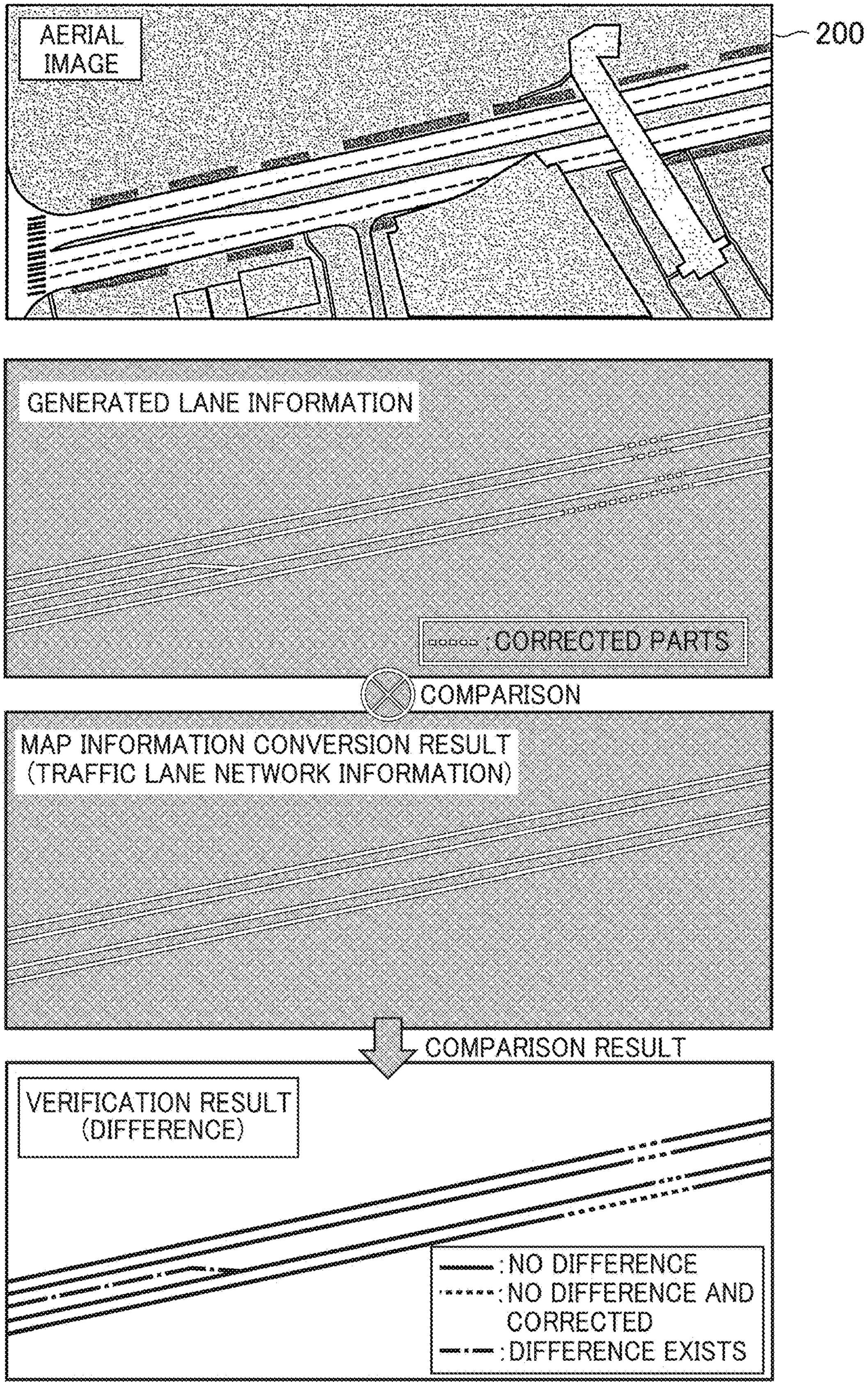
FIG. 5 is a diagram illustrating an example of verifying process of a verification unit.

The verification unit 181 verifies the traffic lane network information stored in the map information storage unit 101 by comparing the information generated by the map information conversion unit 141 and the traffic lane information generation unit 171 (refer to FIG. 5).

The verification in the device configuration is performed by extracting the difference between images or network data corresponding to the output of the map information conversion unit 141 and the output of the traffic lane information generation unit 171. There is the possibility that the images are deviated due to distortion of an aerial image used or a deviation in a map network registered in the map information storage unit 101. To perform alignment, the map information conversion unit 141 can regenerate an image by referring to original network information and adjusting it.

The difference is estimated in the following process, that is, by using determination of the presence/absence of a traffic lane and comparison of traffic lane widths.

In the process of determining the presence/absence of a traffic lane, whether there is information related to a traffic lane in one of images and whether there is no information related to a traffic lane in the other image is determined.

In the process of comparing traffic lane widths, in the case where both of the images have the corresponding traffic lane information, the widths of the traffic lanes in the images are compared, and the difference between the widths is calculated and output.

The difference output is processed in consideration of a conversion error of input data on both sides, and an output unit can be set to the number of pixels, the equivalent number of traffic lanes, or any of the other measurement values related.

For example, there are some possible units to output the difference such as a part of a traffic lane, a set of pixels on an image, a node or a link in a network, and the like. Further, it is assumed that the location of the difference in an original aerial image or map information can be determined according to the conversion process up to this time point.

Output Unit 191

The output unit 191 prepares data generated by the verification unit 181, the map information conversion unit 141, the traffic lane information generation unit 171, the occlusion estimation unit 151, and the road continuity determination unit 161, and outputs the data as a set for a further process by the map information processing device 110 or another external device.

Figure 6:
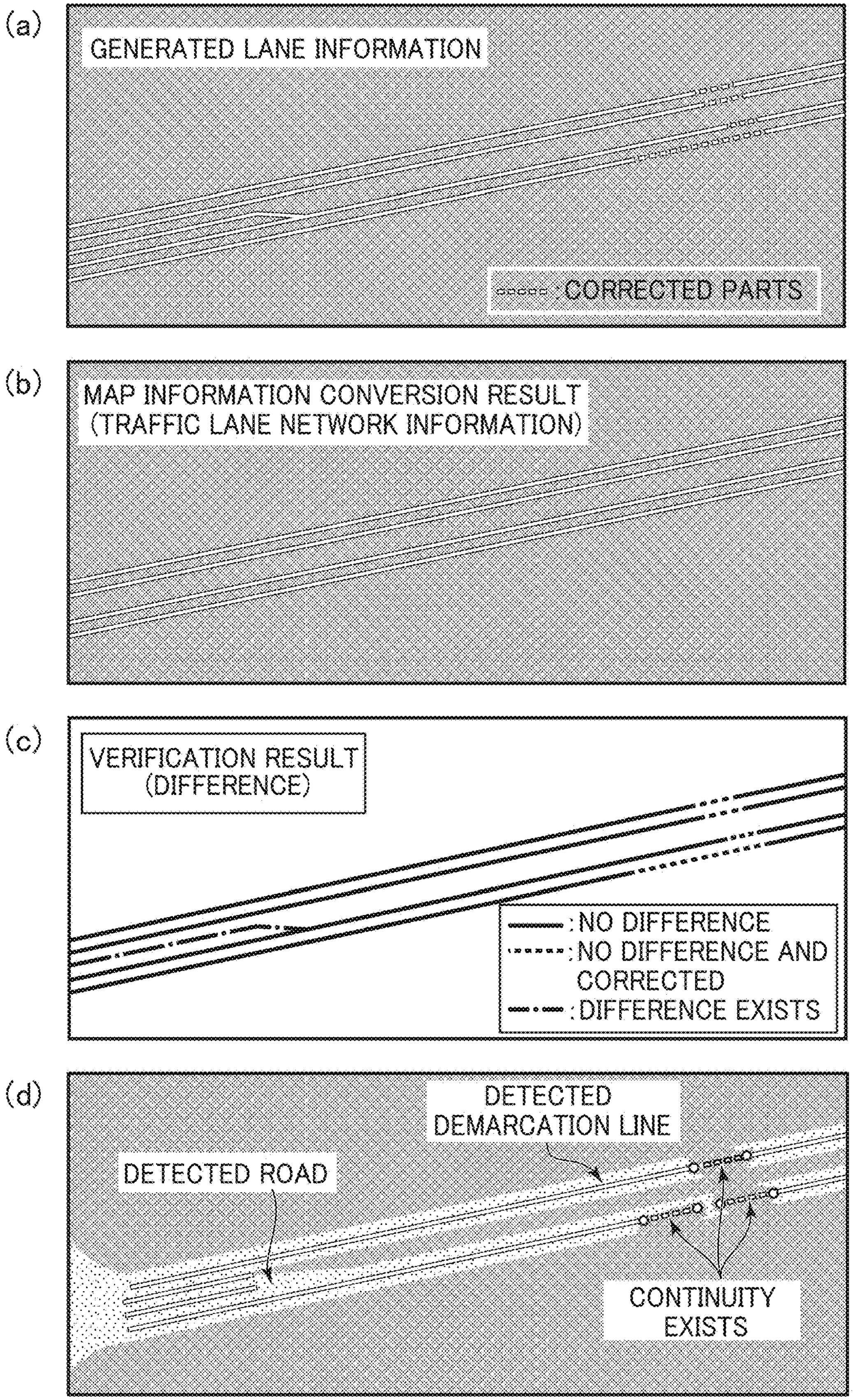
FIGS. 6(*a*), 6(*b*), 6(*c*), and 6(*d*) are diagrams illustrating an example of output process of an output unit and indicating data generated by a traffic lane information generation unit 171, data generated by a map information conversion unit 141, a verification result of a verification unit 181, and remaining data of data generated by a map information processing device 110, respectively.

For example, by using the data, data generated by the traffic lane information generation unit 171 can be explicitly displayed as illustrated in FIG. 6(*a*) (the area obtained by correcting the information on the basis of the result from the road continuity determination unit 161 is illustrated). The data generated by the map information conversion unit 141 can be also displayed as illustrated in FIG. 6(*b*) (which is verified by the above-described method). The result of the verification unit 181 can be explicitly displayed as illustrated in FIG. 6(*c*) (the difference and the location in which data is corrected are displayed for reference).

The remaining data generated by the map information processing device 110 such as road information, demarcation line information, a road continuity result, and the like as illustrated in FIG. 6(*d*) can be also made as a part of an output set, and another application and another display method can be also similarly added.

Specifically, when the traffic lane information generation unit 171 corrects an output of the road information extraction unit 121 on the basis of the road continuity determination unit 161 (by connecting a continuous road and traffic lane which is not connected) to generate the traffic lane information, the output unit 191 capable of outputting a verification result by the verification unit 181 and the like can output the traffic lane information before the correction and the traffic lane information after the correction (refer to, particularly, FIG. 6(*a*).

As described above, the map information processing device 110 according to the embodiment includes: the road information extraction unit 121 extracting road information from an image obtained by shooting a road; the demarcation line information extraction unit 131 extracting demarcation line information from the image; the occlusion estimation unit 151 estimating an occlusion area in which the road is occluded (in the image) on the basis of the road information extraction unit 121 and the map information conversion unit 141 estimating a road area from map information (by generating image information of an estimated road area on the basis of map information stored in the map information storage unit 101, that is, by converting map information to image information of a road area); the road continuity determination unit 161 determining continuity of the road in the occlusion area on the basis of the demarcation line information; the traffic lane information generation unit 171 generating traffic lane information (by correcting an output of the road information extraction unit 121) on the basis of the road information extraction unit 121 and the road continuity determination unit 161; and the verification unit 181 verifying a traffic lane network stored in the map information storage unit 101 by comparing it with the traffic lane information generated by the traffic lane information generation unit 171 (by extracting the difference of traffic lane information (a road information corrected part) generated by the map information conversion unit 141 and the traffic lane information generation unit 171 or by extracting the difference between a road area estimated by the map information conversion unit 141 and traffic lane information generated by the traffic lane information generation unit 171).

That is, by using a satellite image or an aerial photo for map information verification, the map information processing device 110 according to the embodiment generates traffic lane information by which proper traffic lane information which can be generated also in an area from which road information cannot be extracted due to occlusion.

The configuration and the operation of the map information processing device 110 according to the embodiment have been described above. The map information processing device 110 according to the embodiment uses traffic lane information (road information at a traffic lane level) configured from a road area corresponding to a road extracted from an aerial image and, even when there is the possibility that an area in which a road may not be seen by an occlusion exists, assures that the traffic lane information can be properly generated. Therefore, high-reliable verification of a high-precision map can be executed.

Although the preferred embodiment of the present invention which is considered at the present has been described, the embodiment can be variously changed. All of changes within the true spirit and scope of the present invention are intended to be within the scope of the claim for a patent attached.

The present invention is not limited to the foregoing embodiment but various modifications are included. For example, since the foregoing embodiment has been specifically described so that the present invention can be understood easily, the present invention is not always limited to the device having all of the components described.

A part or all of the components, functions, processing units, processing means, and the like may be realized by hardware by, for example, designing them as integrated circuits. Each of the components, functions, and the like may be realized by software by interpreting and executing a program realizing each of the functions by a processor. Information of a program, a table, a file, and the like realizing each function can be stored in a memory, a storage device such as a hard disk or an SSD (Solid State Drive) or a recording medium such as an IC card, an SD card, or a DVD.

Since control lines and information lines which are considered to be necessary for description are illustrated, all of the control lines and information lines in a product may not be illustrated. It may be considered that almost all of components are connected to one another.

LIST OF REFERENCE SIGNS

110: map information processing device
101: map information storage unit
111: image acquisition unit
121: road information extraction unit
131: demarcation line information extraction unit
141: map information conversion unit
151: occlusion estimation unit
161: road continuity determination unit
171: traffic lane information generation unit
181: verification unit
191: output unit

The invention claimed is:

1. A map information processing device comprising:
a processor configured to:
extract road information from an image obtained by imaging a road, by executing a machine learning model, the machine learning model comprising a neural network trained to perform semantic segmentation of an image;
extract demarcation line information from the image by executing the machine learning model;
estimate an occlusion area in which the road is occluded and generate a road area from stored map information, wherein the occlusion area is estimated by comparing the extracted road information and the generated road area;
determine continuity of the road in the occlusion area on the basis of the demarcation line information;
generate traffic lane information by:
completing missing lane segments across occlusion areas using the determined continuity, extracted demarcation line information, and extracted road information,
inserting connection lines in a center of the connected line,
enlarging the lane by half a width of the lane measured in pixels, and
integrating the completed lanes into a node-link traffic lane network; and
verify the node-link traffic lane network by comparing the stored traffic lane network with the generated traffic lane information.

2. The map information processing device of claim 1, wherein the processor is further configured to:
output a verification result,
wherein when the processor corrects the output to generate the traffic lane information, the processor is further configured to output the traffic lane information before the correction and the traffic lane information after the correction.

3. The map information processing device of claim 2, wherein when the occlusion area is extracted the processor determines that there is continuity of the road in the occlusion area, the processor is further configured to correct the output to generate the traffic lane information.

4. The map information processing device of claim 1, wherein with respect to at least two demarcation lines existing via the occlusion area, the processor is further configured to determine continuity on the basis of a demarcation line separation amount indicating a distance between the lines and demarcation line continuity indicating whether one of the demarcation lines continues on an extension line presumed from a shape of the other demarcation line.

5. The map information processing device of claim 1, wherein the processor is further configured to verify the stored traffic lane network by extracting a difference between a generated road area and the generated traffic lane information.

6. The map information processing device of claim 5, wherein the difference includes at least one of information indicating a presence or an absence of a traffic lane and traffic lane width information, the difference being measured pixels.

* * * * *